March 18, 1941. R. N. SEARS 2,235,751
SPARE SEAT FOR AN AUTOMOTIVE CAB
Filed Dec. 29, 1938 2 Sheets-Sheet 1
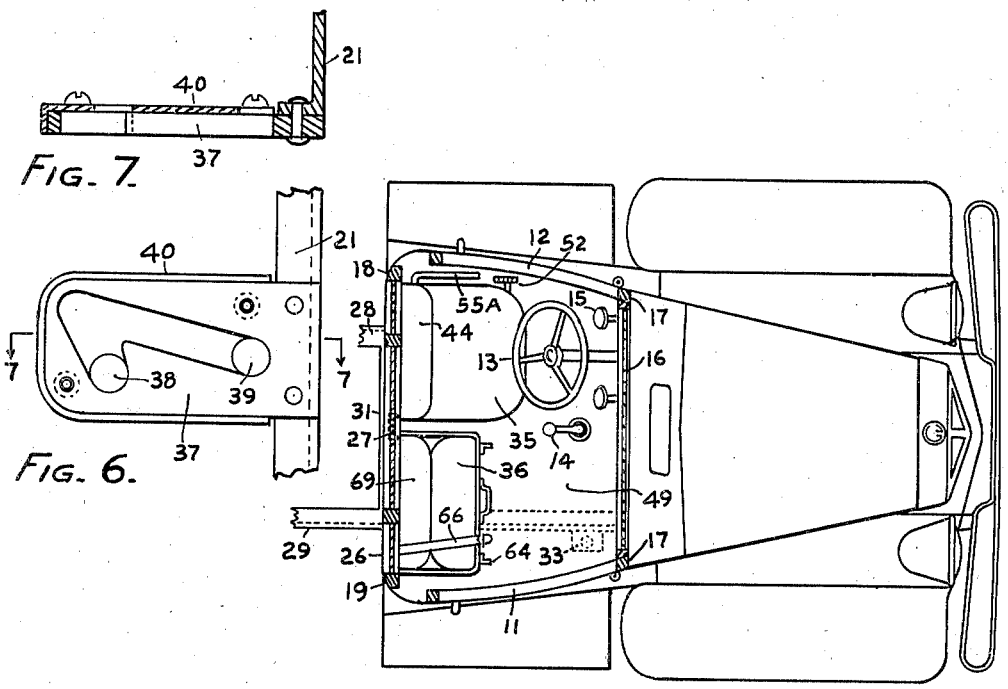
Fig. 7.
Fig. 6.
Fig. 2.
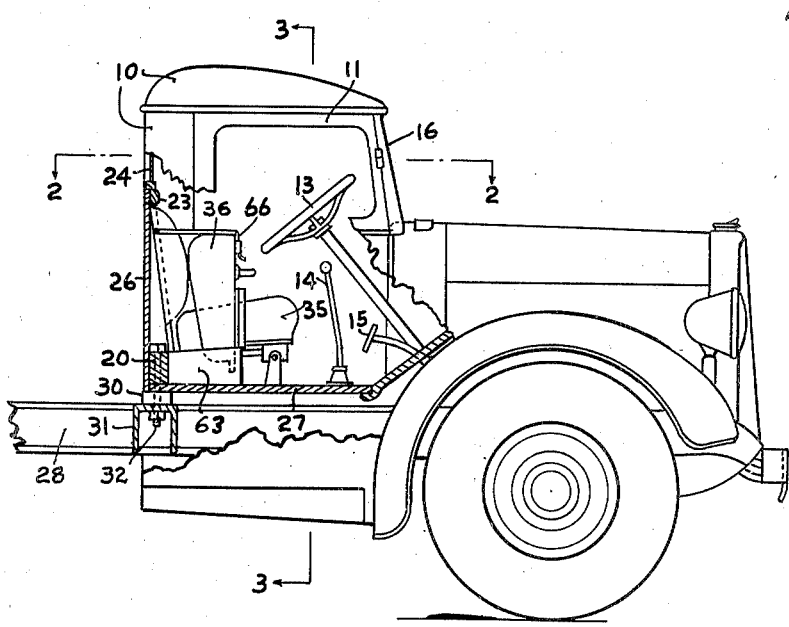
Fig. 1.
INVENTOR.
RUSSELL N. SEARS.
BY Louis Illmer
ATTORNEY.

March 18, 1941. R. N. SEARS 2,235,751
SPARE SEAT FOR AN AUTOMOTIVE CAB
Filed Dec. 29, 1938 2 Sheets-Sheet 2
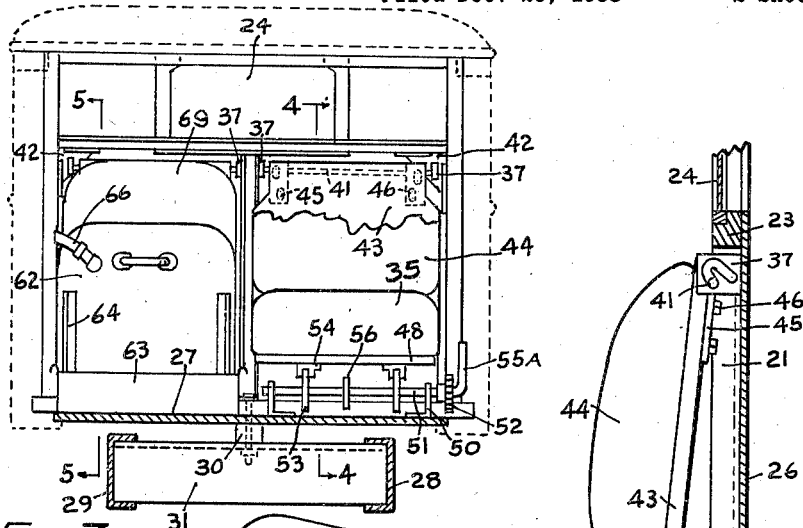
INVENTOR.
RUSSELL N. SEARS.
BY Louis Illmer
ATTORNEY.

Patented Mar. 18, 1941

2,235,751

UNITED STATES PATENT OFFICE 2,235,751

SPARE SEAT FOR AN AUTOMOTIVE CAB

Russell N. Sears, Cortland, N. Y., assignor to Brockway Motor Company, Inc., Cortland, N. Y., a corporation of New York Application December 29, 1938, Serial No. 248,221

3 Claims. (Cl. 155—5)

The present invention pertains to improved twin seat assemblies for an automobile, truck or similar motorized vehicle, and more particularly relates to mated driver's and auxiliary spare seats cooperatively placed alongside each other and ahead of a single transverse rear wall of a cab compartment or the like body partition. The upper edge of the respective back panels may be fixedly or tiltably upheld by said wall in the fashion of supporting stanchion means while the mated seat panels thereof may be differently mounted in order to satisfy the driver's needs, as contrasted with the needs of a spare passenger seat.

In the case of a left-hand driver's installation, it is preferred to pivotally suspend the driver's seat panel from the lower edge of its inclinable back panel and to provide for convenient manipulative adjustments that facilitate finding a comfortable posture on part of characteristically different seat occupants and of otherwise allowing for the unfettered control of the foot pedals.

The back panel of my right hand auxiliary seat may be likewise mounted but the stowable seat panel thereof is preferably kept detachable to permit of compactly stacking the same into an upright position against its upholstered back while my spare seat remains unoccupied. When stowed, my spare seat is stacked wholly within the space confines afforded between the respective rear and forward transverse edges of the driver's seat and in a receded relation thereto. Such cleared provision affords an unobstructed gangway that permits the driver to enter or leave through his right hand cab door when parked alongside a roadway curb.

Long haul truck or the like operators frequently desire a change in posture to promote ease of driving or to relieve fatigue after sitting in a definite position for a protracted time period. Accordingly, the driver's seat and back panels may herein be made universally adjustable although the intermittently used auxiliary or demountable helper's seat panel may be of a more primitive type devoid of complete adjustments but adapted to snugly stack out of the way when not in service.

The object of my invention is to devise a spare seat assembly of the character indicated and embodying certain mounting improvements therein that shall be durable, economical to fabricate and capable of affording reasonable comfort to the seat occupant when set up for use and which seat assembly can readily be installed in certain of a line of standardized cabs without requiring any changes in the conventional structure thereof.

Reference is had to the accompanying two sheets of drawings which are illustrative of a specific disclosure, and in which drawings:

Fig. 1 represents an elevational side view of a motorized cab of which the right hand side wall including the door thereof are partially broken away to reveal the installation of my twin seat improvements.

Fig. 2 is a top view as seen along line 2—2 of Fig. 1, and Fig. 3 depicts a partial transverse elevational view along line 3—3 of Fig. 1.

Figs. 4 and 5 are respectively taken along line 4—4 and 5—5 of Fig. 3 to show the assembly of my driver's seat and of my spare seat.

Figs. 6 and 7 detail a locking device associated with an interchangeable pivotal mounting for each of my back panels.

Fig. 8 is taken along line 8—8 of Fig. 5 and details a slip connection for my seat retaining bracket.

Referring first to the conventional body members disclosed in Figs. 1 and 2, there is here shown a motorized truck cab collectively designated by the numeral 10, that may be equipped with a forwardly hinged right hand side door 11 and a similar left hand side door 12, also the usual accessories including a steering wheel 13, a gear shifter 14 and foot pedals such as 15. A frontal windshield 16 may be located ahead of said wheel between the forward jamb posts such as 17. Said demountable cab body may be provided with a conventional deck that is in part upheld by a pair of rear corner posts 18 and 19 erected upon the rear transverse sill 20. A metallic center upright 21 of channel shape may be interposed between said corner posts and has its flanges directed forwardly, the center post being shown provided with an apertured foot flange 22 that may also rest upon said sill as in Fig. 4.

The upper end of the center upright may support a cross bar 23 that spans the rear corner posts and may be arranged to serve as a lower sash for a rear transom window 24 located beneath the body deck. The recessed rear partition wall of my cab may be encased by a metallic tail sheath 26 that extends down to the floor board 27. As equivalent seat stanchion means, a van body may by a similar partition, be divided into a driver's compartment and a rear loading compartment.

The conventional chassis for my bodily demountable cab preferably comprises a pair of reversely disposed frame channels 28 and 29, the cab being supported thereon through a three-point or similar triangular mounting. Such rear cab support may comprise a resilient buffer block 30 of rubber or the like that is shown interposed between the sill 20 and a chassis cross beam 31. An elongated bolt 32 secures the foot flange 22 to said cross beam in the Fig. 4 manner, it being preferred to also interpose the floor board 27 therebetween. The other pair of cab supports are located forwardly to straddle the centralized pad 30 and may be fastened to the side of the respective frame channels by reversed angular extensions 33, one such being indicated by dotted outline in Fig. 1.

Having described the structural features of a suitable cab compartment, I install therein in a contiguous forward relation to the tail sheath 26, a cushioned driver's seat 35 located immediately behind the steering wheel and alongside of an upholstered auxiliary or spare seat 36 in the assembled manner indicated in Fig. 1. Referring first in detail to said driver's seat, this is preferably but not necessarily, of the universally adjustable type. To this end, the center upright 21 may have welded thereto a forwardly overhanging bracket fixture 37 that is preferably slotted into an inverted V shape to terminate in opposed rod receiving apertures such as 38 and 39 shown in Figs. 6 and 7. A screw secured retaining plate 40 may be flanged to telescopically fit over the projecting perimeter of said fixture and serve to positively hold one end of the back suspension rod 41 against release after being selectively inserted in one or the other slot terminals of said fixture. The inner edge of the next adjacent corner post may be provided with a gusset brace 42 secured into place beneath the cross bar 23 and likewise provided with a complementary bracket similar to fixture 37. The back panel may be dismantled by withdrawal of the suspension rod 41 from its supporting fixtures.

The rod 41 may be interlockingly inserted between such complementary brackets into either of their registering apertures 38 or 39, which allows of altering the inclination of my back panel 43 of the driver's seat with respect to the tail sheath 26, said panel being provided with a fixedly attached back cushion 44. The rear of this back panel may be equipped with a pair of adjustable pintle straps such as 45 of which the respective upper ends are suspended from the rod 41. The lower panel edge is provided with hinge means 47 by which to pivotally attach the rear edge of the horizontally disposed seat panel 48 having the seat cushion 35 attached thereto.

Referring now in detail to the mated spare seat 36, this as indicated in Fig. 5, may comprise a back panel 61 and its upholstery 69 whose upper edge may be mounted in fixtures substantially identical with those for the driver's back panel 43, although the back may be otherwise sustained. If desired, the lower edge of the back panel 61 may be demountably entered into the stationary retaining bracket 70 or may be positively affixed to the seat riser. The demountable auxiliary seat panel 62 and its cushion 36 when in service, are preferably superimposed to stack upon and span an open mouthed, box-shaped riser frame or hollow seat understructure 63 of sheet metal shaped to enclose a well therein of which the endless upstanding oblong mouth edge that may have said spare seat panel centered thereon when placed in its operative position. Said frame 63 preferably comprises opposed forward and rear walls extending in parallelism with the sheathed body partition 26 and which opposed walls are cross-connected by laterally spaced end walls to afford an upturned rim having an open mouth wherein to stack and partially enter my seat panel in its stowed position. It will also be noted that one of said last named walls lies alongside the inner end of the driver's seat and that in operative position both seat panels are preferably disposed in horizontal tandem alignment.

The demountable panel 62 is preferably of a size and shape that will be interchangeable with the corresponding driver's panel and adapted to replace the latter should the driver's cushion become badly worn after extended usage. When making such replacement some of the original fittings can readily be applied, or if preferred, both sets of panels may be completely factory equipped to permit a change of this kind without substitute fittings.

As detailed in Figs. 5 and 8, the seat panel 62 preferably extends rearwardly beyond its cushion to leave a projecting tongue portion 71. The retaining bracket 70 may further comprise complementary socket jaws such as 72 arranged to slip engage said tongue in operative spare seat position, one end of the transverse cleat 64 then being demountably entered behind the forward riser wall as a panel stop agency.

Said shiftable auxiliary seat panel may be equipped with one or more centering irons or cleat means such as 64 whereby to uphold a portion of the stowed panel 62 and also have a lifting grip 65 attached therebeneath. When operatively assembled, the seat panel 62 assumes its dotted position but may be bodily lifted off said riser and compactly stacked upright toward its back 61 into the full-lined stowed position in a receded relation to both the forward and rearward edge confines of the driver's seat panel 48 as indicated in Fig. 5, being secured in place by the buckle strap 66.

The front confines of the riser 63 is also set well back of the forward transverse edge of the driver's seat as depicted in Fig. 1. Such upturned dismantled seat panel disposition leaves a cleared aisle spacing or passageway 49 (see Fig. 2) behind the windshield extending between the right hand side door 11 and the seat 35 through which the driver may freely step out of or into my cab when parked along the right shoulder of a highway without being exposed to the danger of fast passing traffic. In case a passenger rider is to be carried, the stowed seat can quickly be unbuckled and placed from a stowed into operative position. The hollow riser 63 may also be utilized as a tool box and for instance, have a relatively long starting crank 67 stored therein, in which case a riser side wall may be apertured at 68 to receive one crank end therethrough.

As will be understood by those skilled in this art, the disclosed mated seat assemblies may find application to purposes other than automotive cab compartments and that various modifications in the structural details or disposition of the spare seat may be resorted to in likewise carrying out my illustrative embodiment, all without departing from the spirit and scope of my invention heretofore described and more particularly defined in the appended claims.

I claim:

1. In a vehicle body compartment including a floor board having a rear partition wall mounted thereon, a hollow seat supporting riser frame rigidly upheld by said floor board above the level thereof to comprise opposed forward and rear riser walls that are erected in substantial parallelism with the partition wall and interconnected to constitute a pit having an upturned mouth, a stationary retaining bracket including jaw means located contiguous to the rim region of the rear riser wall, an upstanding back panel whose lower and upper marginal edges are respectively affixed to said retaining bracket and to the partition wall, and a bodily demountable spare seat panel that is independently shiftable into alternative stowed and operative positions with respect to the affixed back panel and the riser frame and which seat panel in its operative horizontal position lies flatwise astride the forward riser wall and having its rear longitudinal edge region extended into slip engagement with said jaw means, said seat panel when disengaged being stowable edgewise into a vertical position wherein a lower marginal panel portion is entered into said pit mouth inwardly behind the forward riser wall to a level lying wholly above said floor board.

2. In a vehicle body compartment including a floor board having a rear partition wall mounted thereon, a hollow seat supporting riser frame rigidly upheld by said floor board above the level thereof to comprise opposed forward and rear riser walls that are erected in substantial parallelism with the partition wall and interconnected to constitute a pit having an upturned mouth, a stationary retaining bracket including jaw means located contiguous to the rim region of the rear riser wall, an upstanding back panel whose lower and upper marginal edges are respectively affixed to said retaining bracket and to the partition wall, a bodily demountable spare seat panel that is independently shiftable into alternative stowed and operative positions with respect to the affixed back panel and the riser frame and which seat panel in its operative horizontal position is stackable flatwise astride the forward riser wall and having its rear longitudinal edge region extended into slip engagement with said jaw means, cleat means depending from the seat panel and disposed to enter behind a riser frame wall as a stop agency when said seat panel is engaged with the jaw means, said seat panel when disengaged being freely stackable edgewise into a vertically stowed position wherein a lower marginal panel portion is entered into said pit mouth inwardly behind the forward riser wall to a level lying wholly above said floor board.

3. In a vehicle body compartment including a floor board having a rear partition wall mounted thereon, a hollow seat supporting riser frame rigidly upheld by said floor board above the level thereof to comprise opposed forward and rear riser walls that are erected in substantial parallelism with the partition wall and interconnected to constitute a pit having an upturned mouth, a stationary retaining bracket including jaw means located contiguous to the rim region of the rear riser wall, a bodily demountable spare seat panel that is independently shiftable into alternative stowed and operative positions with respect to the riser frame and which seat panel in its operative horizontal position is demountably stackable flatwise astride the forward riser wall and having its rear longitudinal edge region extended into slip engagement with said jaw means, elongated cleat means extending crosswise beneath the seat panel and entered behind the forward riser frame wall as a stop agency when said seat panel is engaged with the jaw means, said seat panel when disengaged being freely stackable edgewise into a vertically stowed position wherein a lower marginal panel portion is entered into said pit mouth and one end of which cleat then rests upon the forward riser wall to uphold the stowed panel above the level of said floor board.

RUSSELL N. SEARS.